US 8,092,101 B2

(12) United States Patent
Basho

(10) Patent No.: US 8,092,101 B2
(45) Date of Patent: *Jan. 10, 2012

(54) IMAGING APPARATUS WITH ROTATABLE LENS BARREL

(75) Inventor: Yutaka Basho, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/652,789

(22) Filed: Jan. 6, 2010

(65) Prior Publication Data

US 2010/0111516 A1     May 6, 2010

Related U.S. Application Data

(63) Continuation of application No. 11/986,891, filed on Nov. 27, 2007, now Pat. No. 7,661,890.

(30) Foreign Application Priority Data

Nov. 29, 2006   (JP) ................................ P2006-322478

(51) Int. Cl.
   *G03B 17/00*   (2006.01)
(52) U.S. Cl. ......................................... 396/427; 396/535
(58) Field of Classification Search .................. 396/427, 396/439, 535
   See application file for complete search history.

(56) References Cited

U.S. PATENT DOCUMENTS

| 4,920,367 | A | * | 4/1990 | Pagano ........................... | 396/427 |
| 5,028,997 | A | * | 7/1991 | Elberbaum ..................... | 348/143 |
| 5,221,964 | A | | 6/1993 | Chamberlain et al. | |
| 5,418,567 | A | * | 5/1995 | Boers et al. .................... | 348/375 |
| 5,689,304 | A | * | 11/1997 | Jones et al. ..................... | 348/373 |
| 5,806,789 | A | * | 9/1998 | Boulware et al. ............. | 244/1 R |
| 6,200,042 | B1 | * | 3/2001 | Tamura et al. ................. | 396/427 |
| 6,357,936 | B1 | * | 3/2002 | Elberbaum ..................... | 396/427 |
| 7,661,890 | B2 | * | 2/2010 | Basho ............................ | 396/427 |
| 2002/0085844 | A1 | * | 7/2002 | Tashiro et al. ................. | 396/427 |
| 2005/0041965 | A1 | * | 2/2005 | Morozumi ..................... | 396/427 |
| 2006/0177217 | A1 | * | 8/2006 | Opmeer ......................... | 396/427 |
| 2007/0295893 | A1 | * | 12/2007 | Olsen et al. ................... | 250/226 |
| 2009/0028542 | A1 | * | 1/2009 | Nakamoto et al. ............ | 396/427 |

FOREIGN PATENT DOCUMENTS

JP         2000 156806         6/2000

* cited by examiner

*Primary Examiner* — Clayton E Laballe
*Assistant Examiner* — Warren Fenwick
(74) *Attorney, Agent, or Firm* — Frommer Lawrence & Haug LLP; William S. Frommer

(57) ABSTRACT

An imaging apparatus with a rotatable lens barrel includes the following elements. An optical block includes a lens. An imaging block includes an imaging device. The lens barrel receives the respective blocks and includes a rotating truncated ball larger than a hemisphere of a virtual sphere formed by extending the curved surface of the truncated ball. A mount rotatably holds the lens barrel. The mount includes a support and a retainer. The support has a circular hole with a diameter smaller than that of the truncated ball and holds the ball such that the ball is fitted in the hole. The retainer has a circular opening with a diameter smaller than that of the truncated ball and holds the ball in the opening so as to prevent the lens barrel from coming out. At least part of the optical block is located within the virtual sphere.

6 Claims, 7 Drawing Sheets

IMAGING APPARATUS WITH ROTATABLE LENS BARREL

This is a continuation of application Ser. No. 11/986,891, filed Nov. 27, 2007 now U.S. Pat. No. 7,661,890, which is entitled to the priority filing date of Japanese application P2006-322478 filed on Nov. 29, 2006, the entirety of which is incorporated herein by reference.

CROSS REFERENCES TO RELATED APPLICATIONS

The present invention contains subject matter related to Japanese Patent Application JP 2006-322478 filed in the Japanese Patent Office on Nov. 29, 2006, the entire contents of which are incorporated herein by reference.

BACKGROUND OF THE INVENTION

1. Field of the Invention

The present invention relates to an imaging apparatus with a rotatable lens barrel that receives an optical block and an imaging block, and in particular, to a technique of preventing an increase in the size of an imaging apparatus when the optical block includes a large lens.

2. Description of the Related Art

As one of imaging apparatuses having a rotatable lens barrel, there is a dome type surveillance video camera (hereinafter, referred to as "dome surveillance video camera" or "dome video camera") mounted on a ceiling or wall of, for example, a building. The dome video cameras are disposed in hospitals, hotels, and department stores for purposes of ensuring security and improving serviceability. Captured images are used for surveillance. An optical block including a lens and an imaging block including an imaging device are received in a lens barrel. The lens barrel is attached so as to be rotatable in the horizontal direction (hereinafter, panning direction) and/or the vertical direction (hereinafter, tilting direction) and is covered with a dome-shaped cover (hereinafter, dome cover) such that the cover surrounds the outer region of a motion space for the lens barrel. An imaging signal output from the imaging block is supplied to a monitor in a monitoring room through a coaxial cable.

To set up the dome video camera, the coaxial cable is connected to the rear of the video camera and the video camera is then fixed to a ceiling or wall of a building with metal inserts. Subsequently, the lens is adjusted so as to have a predetermined orientation (direction and angle) by an angle adjustment mechanism for the lens barrel, thus controlling the focus and zoom of the lens. In this instance, the set-up is performed using a portable monitor while a monitor image is being viewed in a set-up site to confirm the imaging direction and the imaging range. Finally, the video camera is covered with the dome cover for dust protection. Thus, a series of set-up operations is completed.

As described above, the orientation of the lens is determined by adjusting the angle of the lens barrel upon set-up of the dome video camera. For the angle adjustment mechanism, a technique using a ball joint is known. In other words, a rotating ball arranged at the proximal end of the lens barrel allows the lens barrel to be movable in the panning direction and/or the tilting direction. A retainer retains the ball on a support arranged in a mount. Japanese Unexamined Patent Application Publication No. 2005-156806 (Patent Document 1) discloses an example of the above-described dome video camera.

FIGS. 7A and 7B are partially sectional views of related-art dome video cameras 100a and 100b disclosed in Patent Document 1, respectively.

Referring to FIG. 7A (7B), the dome video camera 100a (100b) includes an optical block 170a (170b) including a lens 171a (171b), and an imaging block 180a (180b) including a charge coupled device (CCD) 181a (181b). The optical block 170a (170b) and the imaging block 180a (180b) are received in a lens barrel 150a (150b). The proximal end of the lens barrel 150a (150b) is secured to a rotating spherical member (hereinafter, a rotating ball) 152.

The rotating ball 152 is disposed on a cylindrical support 142 arranged on a base 141 of a mount 140. The support 142 has a circular hole 142a having a diameter smaller than that of the rotating ball 152. The rotating ball 152 is fitted in the hole 142a. Since the rotating ball 152 is rotatable on the hole 142a, the orientation of the ball 152 is appropriately adjusted to determine the lens 171a (171b) in a predetermined orientation (direction and angle).

The rotating ball 152 is held on the mount 140 by a retainer 143 and is fixed in the predetermined orientation. In other words, the mount 140 has a cylindrical male threaded member 144 that surrounds the support 142. The retainer 143 is screwed to upper end part of the male threaded member 144. The retainer 143 has a circular opening 143a having a diameter smaller than that of the ball 152. The rotating ball 152 is arranged in the opening 143a so as to partially protrude from the opening 143a. Accordingly, the ball 152 is disposed in a space defined by the retainer 143 and the support 142 so as to be prevented from coming out of the opening 143a. Therefore, the rotating ball 152 is held on the mount 140. While the retainer 143 is loosely screwed to the male threaded member 144, the rotating ball 152 is movable.

In a state (shown in FIGS. 7A and 7B) where the retainer 143 is tightly screwed to the male threaded member 144, the rotating ball 152 in contact with the periphery of the opening 143a is pressed against the support 142. Thus, the rotating ball 152 is pressed between the opening 143a and the hole 142a. Therefore, the orientation of the rotating ball 152 is adjusted to determine the lens 171a (171b) in the predetermined orientation (direction and angle) and the retainer 143 is screwed to the male threaded member 144 while the determined state of the lens is being maintained, so that the rotating ball 152 is fixed in the determined state because the rotating ball 152 is pressed against the opening 143a.

As described above, in the angle adjustment mechanism using such a ball joint in the related-art dome video camera 100a (100b) shown in FIG. 7A (7B), the rotating ball 152 is secured to the proximal end of the lens barrel 150a (150b) with screws and the rotating ball 152 is rotatably held by the mount 140 (specifically, the support 142, the retainer 143, and the male threaded member 144). The retainer 143 is slightly unscrewed from the male threaded member 144 so that the rotating ball 152 is movable, the lens barrel 150a (150b) is appropriately rotated in the panning direction and/or the tilting direction, and the retainer 143 is tightly screwed to the male threaded member 144. Thus, the lens 171a (171b) can be determined in a desired orientation (direction and angle). A cover 120a (120b) is attached after the lens 171a (171b) is determined in the desired orientation.

SUMMARY OF THE INVENTION

The above-described related art (the dome video cameras 100a and 100b shown in FIGS. 7A and 7B) disclosed in Patent Document 1 has a disadvantage in that the covers 120a and 120b, which correspond to the lens barrels 150a and 150*b*, respectively, have different sizes. In other words, for the lens barrel 150*a* containing the optical block 170*a*, which includes the relatively small lens 171*a*, and the imaging block 180*a*, which includes the relatively small CCD 181*a*, as shown in FIG. 7A, the lens barrel 150*a* can be covered with the relatively small cover 120*a*.

In the use of the relatively large lens 171*b* for high image quality as shown in FIG. 7B, however, the optical block 170*b*, the imaging block 180*b* including the CCD 181*b*, and the lens barrel 150*b* containing the optical block 170*b* and the imaging block 180*b* are larger than the similar components in FIG. 7A so that the optical block 170*b*, the imaging block 180*b*, and the lens barrel 150*b* match the large lens. Since the large lens barrel 150*b* is secured to the rotating ball 152 in the dome video camera 100*b*, therefore, the radius of the dome video camera 100*b*, i.e., the distance between the center of rotation of the rotating ball 152 to the lens 171*b* is long. Unfortunately, the cover 120*b* is also large.

It is desirable that when a small lens (or a small optical block) is replaced with a large lens (or a large optical block) for higher image quality in an imaging apparatus, the same cover should be used since the distance between the center of rotation of a rotating spherical member (truncated ball) and each lens is the same, thus preventing an increase in the size of the imaging apparatus.

According to an embodiment of the present invention, an imaging apparatus with a rotatable lens barrel includes the following elements. An optical block includes a lens. An imaging block includes an imaging device. The lens barrel receives the optical and imaging blocks and includes a rotating truncated ball that is larger than a hemisphere of a virtual sphere formed by extending the curved surface of the truncated ball. A mount rotatably holds the lens barrel. The mount includes a support and a retainer. The support has a circular hole with a diameter smaller than that of the truncated ball and holds the truncated ball such that the ball is fitted in the hole. The retainer has a circular opening with a diameter smaller than that of the truncated ball and holds the truncated ball in the opening such that the ball does not come out of the opening in order to prevent the lens barrel from coming out. The imaging block is arranged within the truncated ball. At least part of the optical block is located within the virtual sphere.

In this embodiment, the imaging block is disposed within the rotating truncated ball and at least part of the optical block is located within the virtual sphere obtained by extending the curved surface of the truncated ball. In other words, the imaging block and at least part of the optical block are received in the truncated ball. Advantageously, appropriately adjusting the length of inserted part of the optical block into the truncated ball keeps the same distance between the center of rotation of the truncated ball and the lens irrespective of the size of the lens (or the optical block).

According to the embodiment of the present invention, the same distance from the center of rotation of the truncated ball to a lens is maintained irrespective of the size of the lens (or the optical block). Accordingly, any of different sized lenses (optical blocks) can be used together with the same cover. Therefore, the use of a relatively large lens for high image quality does not cause an increase in the size of the imaging apparatus.

DESCRIPTION OF THE PREFERRED EMBODIMENTS

An embodiment of the present invention will now be described with reference to the drawings.

In the following description, a dome surveillance video camera 10 (10*a*, 10*b*) will be explained as an example of an imaging apparatus with a rotatable lens barrel according to an embodiment of the present invention. The dome video camera 10 (10*a*, 10*b*) according to the embodiment is mounted on a ceiling or wall of a hospital, a hotel, or a department store to perform surveillance using captured images for purposes of ensuring security and improving serviceability.

Figure 1A:
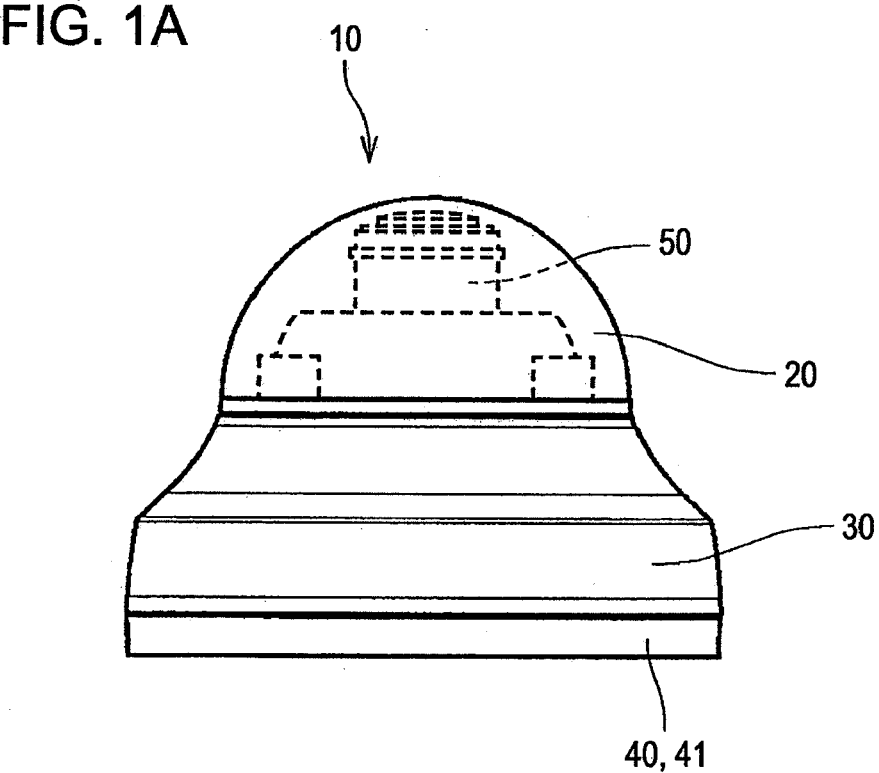
FIGS. 1A and 1B are external views of a dome video camera according to an embodiment of the present invention.
Figure 1B:
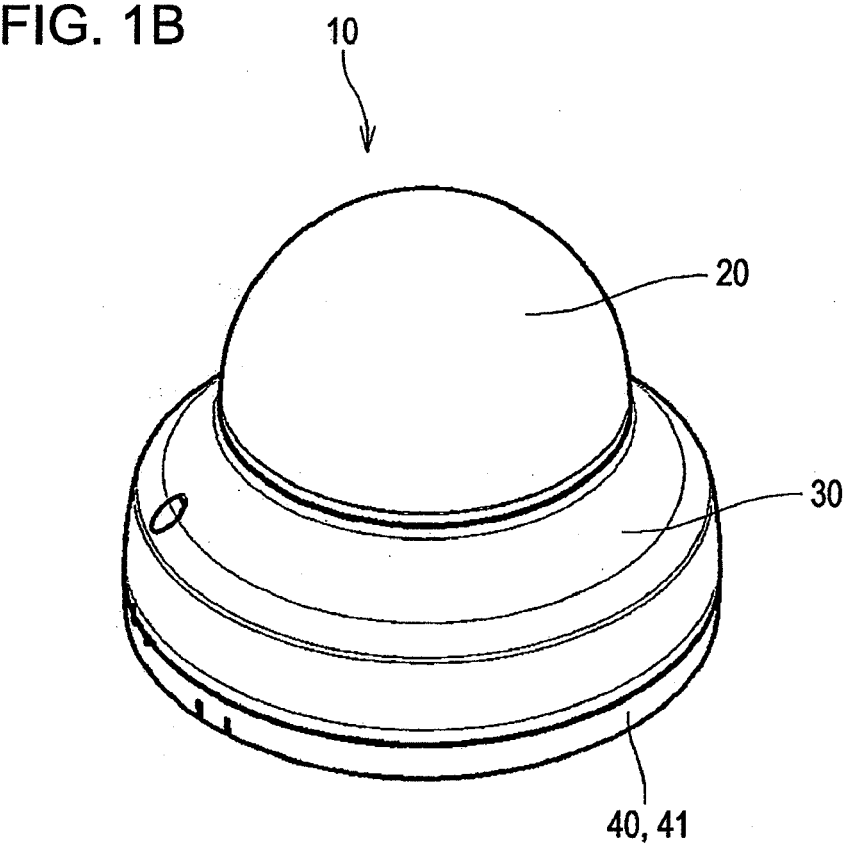

FIGS. 1A and 1B show the appearance of the dome video camera 10 according to the embodiment of the present invention. FIG. 1A is a side view of the dome video camera 10. FIG. 1B is a perspective view of the dome video camera 10.

Referring to FIGS. 1A and 1B, the dome video camera 10 according to the present embodiment includes a dome (hemispherical) cover 20, a casing 30, and a mount 40. The cover 20 is attached to the casing 30. The mount 40 is secured to a ceiling or wall. When the dome video camera 10 is disposed on a ceiling, the dome video camera 10 is opposite in direction to that in FIG. 1A. In other words, the cover 20 faces downward and the mount 40 is located in an upper portion of FIG. 1A (on the side of the ceiling).

The cover 20 is a light-transmissive molded product (e.g., an acrylic resin injection molded product). In the use of acrylic resin, the refractive index of the cover 20 is 1.5 and the reflectance thereof is 90% or higher. Those values can approach the refractive indices and reflectances of optical lenses. Since the cover 20 is formed by injection molding, the cover 20 can be mirror-finished with high precision. Generally, the cover 20 is translucent so that the dome video camera 10 can capture images without being noticed as much as possible. For example, a carbon material is mixed with acrylic resin before injection molding to control the transmittance of the cover 20. In this case, the cover 20 is smoke-colored. Alternatively, the surface of the cover 20 is coated with metal powder of, for example, aluminum. In this case, the cover 20 is half-mirror finished such that the transmittance, reflectance, and absorptance of the cover 20 are each approximately 33%.

The casing 30 is a molded product (e.g., an ABS resin molded product) and is cylindrical. The cover 20 is detachably attached to the casing 30. The cover 20 has three protrusions (not shown) arranged 120 degrees apart on its rim. The casing 30 has three notches (not shown) which correspond to the respective protrusions. When the cover 20 is attached to the casing 30, the respective protrusions of the cover 20 are simultaneously inserted into the corresponding notches. Rotating the cover 20 allows the protrusions to seat in the notches. Thus, the cover 20 is held by the casing 30. On the other hand, to detach the cover 20 from the casing 30, the cover 20 may be rotated in the direction opposite to that in the attachment and each protrusion may be detached from the corresponding notch.

Within the space defined by the cover 20 and the casing 30, a lens barrel 50 (refer to FIG. 1A) receiving an optical block 70 (70a, 70b) and an imaging block 80 (80a, 80b) is arranged. The optical block 70 (70a, 70b) and the imaging block 80 (80a, 80b) will be described later. The lens barrel 50 is rotatably held on the mount 40. Accordingly, when the cover 20 is detached from the casing 30 and the lens barrel 50 is set in a predetermined orientation (direction and angle), a desired area can be monitored using captured images. If the cover 20 attached to the casing 30 is translucent, the lens barrel 50 (or the optical block) can be hidden so as not to be visible externally.

The mount 40 of the dome video camera 10, including the cover 20 and the casing 30, according to the present embodiment is disposed on a ceiling or wall. In other words, the mount 40 has a disc-shaped die-cast base 41 made of metal, e.g., aluminum alloy. The mount 40 is secured to, for example, a ceiling by means of metal inserts (not shown) attached to the base 41. The disposed dome video camera 10 is connected to a monitor in a monitoring room by a coaxial cable, which is embedded in the ceiling such that the cable is hidden so as not to be visible externally.

Figure 2A:
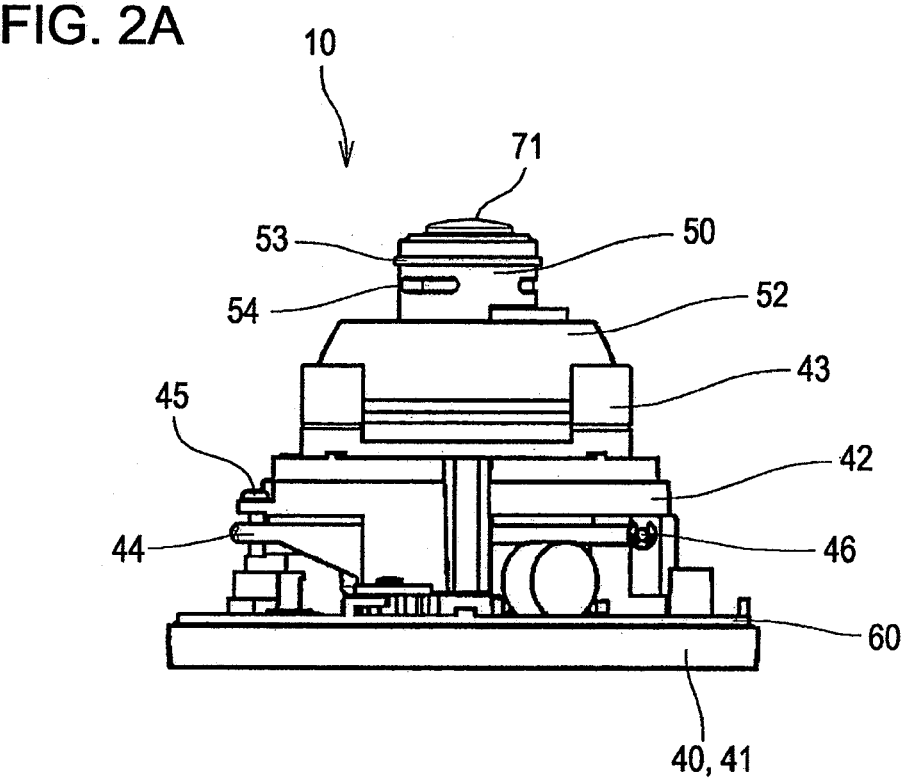
FIGS. 2A and 2B are external views of the dome video camera according to the embodiment, particularly, a mount and a lens barrel of the video camera.
Figure 2B:
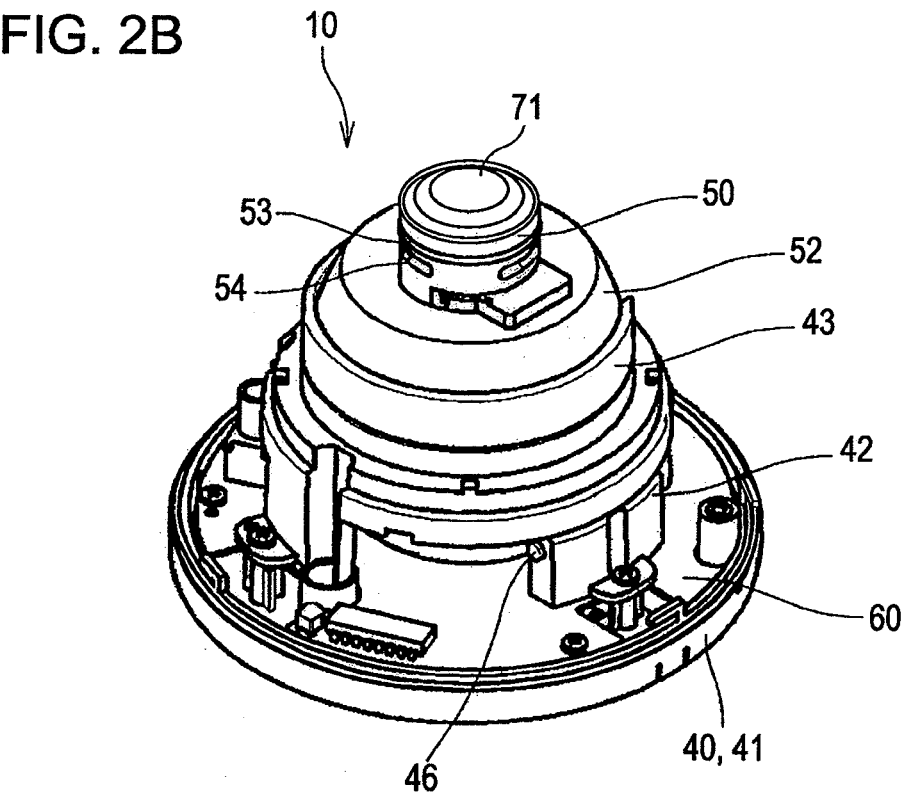

FIGS. 2A and 2B show the dome video camera 10 according to the present embodiment in a state where the cover 20 and the casing 30 are removed. FIG. 2A is a side view of the video camera 10 in this state. FIG. 2B is a perspective view thereof.

Since the cover 20 and the casing 30 are removed from the dome video camera 10 shown in FIGS. 1A and 1B, the mount 40 and the lens barrel 50 are exposed as shown in FIGS. 2A and 2B.

The mount 40 includes the disc-shaped base 41, a support 42 disposed on the base 41, and a cylindrical retainer 43. The support 42 holds a rotating truncated ball 52 of the lens barrel 50. The retainer 43 receives the truncated ball 52 to prevent the lens barrel 50 from coming out. A circuit board 60 is attached to the base 41. The circuit board 60 is mounted with various electronic components for converting dark and light parts of an optical image formed on the imaging surface of an imaging device into charges, sequentially reading the charges, and converting the charges into electrical signals. The circuit board 60 functions as both of a signal processing board and a power supply board and includes a monitor output terminal, a coaxial cable terminal, switches and a volume control knob.

The support 42 includes a circular movable member 44 and a set screw 45. The movable member 44 holds the truncated ball 52 and presses the truncated ball 52 against the retainer 43. The set screw 45 permits the movable member 44 to reciprocate. The movable member 44 is pivoted about a rotating shaft 46 which is arranged on the periphery of the movable member 44 in the support 42. The set screw 45 is arranged on a portion opposed to the rotating shaft 46 in the support 42 and is screwed through the periphery of the movable member 44.

When the set screw 45 is rotated clockwise (i.e., screwed), the movable member 44 is pivoted about the rotating shaft 46 upward in FIG. 2A, so that the end of the movable member 44 remote from the rotating shaft 46 is pressed toward the retainer 43. Thus, the truncated ball 52 disposed on the movable member 44 is pressed against the retainer 43. On the contrary, when the set screw 45 is rotated counterclockwise, the movable member 44 is pivoted about the rotating shaft 46 downward in FIG. 2A, so that the end of the movable member 44 remote from the rotating shaft 46 is moved toward the base 41.

The lens barrel 50 is rotatable in the panning direction and/or the tilting direction by the truncated ball 52 so that a lens 71 is determined in a desired orientation (direction and angle). The lens barrel 50 has a focus ring 53 and a zoom lever 54, so that a desired size image of light coming from a subject can be formed on the imaging surface of the imaging device.

First Example

Figure 3:
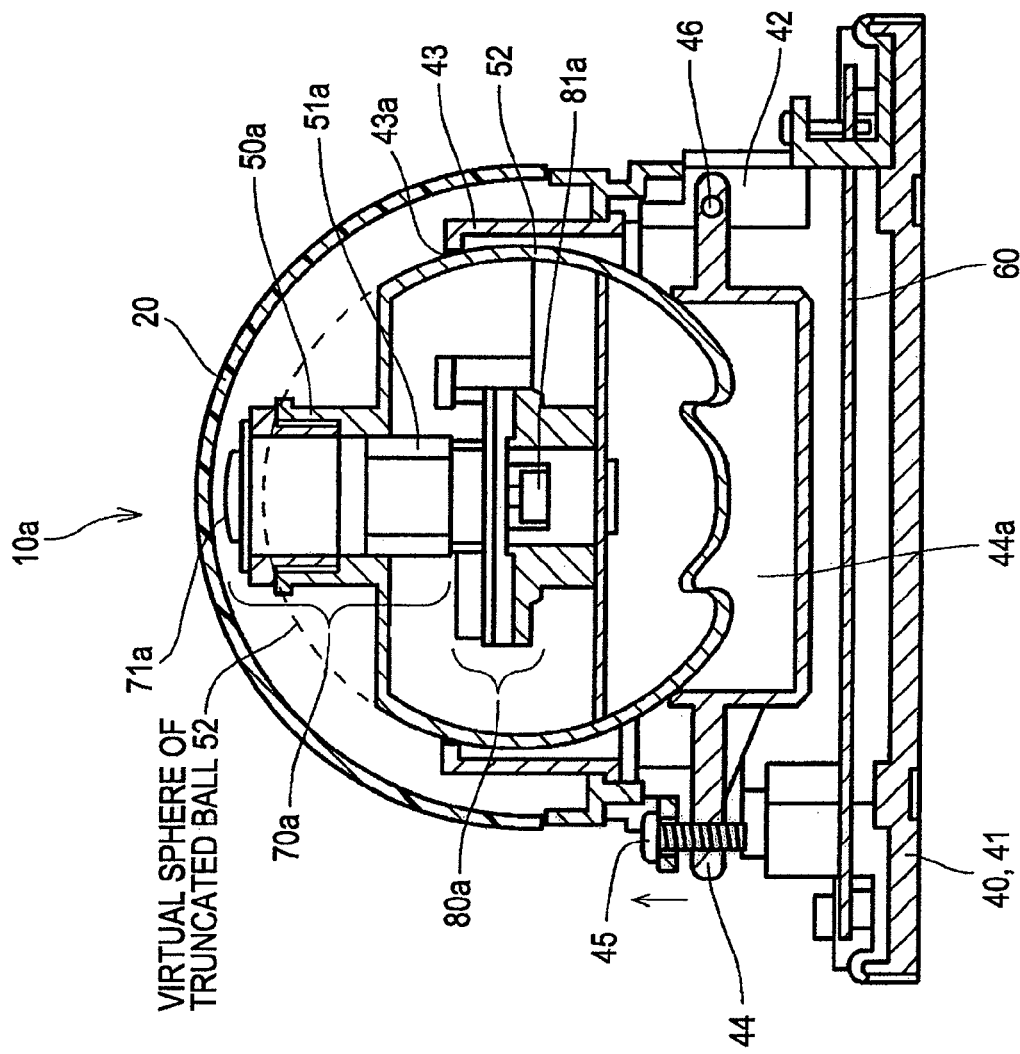
FIG. 3 is a cross-sectional view of a dome video camera according to a first example of the embodiment.

FIG. 3 is a cross-sectional view of a dome video camera 10a according to a first example of the present embodiment.

The dome video camera 10a according to the first example uses a lens 71a that is smaller than a lens in a dome video camera 10b according to a second example of the present embodiment. The second example will be described later. An optical block 70a including the lens 71a is received in a lens barrel 50a including a cylindrical tube 51a and the rotating truncated ball 52. The lens barrel 50a is a die-cast of metal, e.g., aluminum alloy.

The lens 71a is a varifocal lens assembly containing a plurality of relatively small lens elements. The lens 71a is attached in the cylindrical tube 51a, so that the entire cylindrical tube 51a constitutes the optical block 70a. The optical block 70a excluding the lens 71a is arranged within a virtual sphere, indicated by a dashed line in FIG. 3, obtained by extending the curved surface of the rotating truncated ball 52 which is larger than the hemisphere of the virtual sphere. Specifically, about the outer half of the optical block 70a (in which the lens 71a is arranged) is disposed on the outside of the truncated ball 52 and about the inner half of the optical block 70a is arranged within the truncated ball 52 that is hollow.

A CCD 81a (corresponding to the imaging device according to the present embodiment) has a relatively small size so as to match the lens 71a. The whole of an imaging block 80a including the CCD 81a is located within the truncated ball 52. The imaging block 80a further includes a CCD substrate mounted with the CCD 81a in addition to the relatively small CCD 81a. The CCD 81a is disposed on the rear side of the optical block 70a on the optical axis of the lens 71a. Accordingly, the entire imaging block 80a is arranged within the truncated ball 52 which is hollow. An imaging signal output from the CCD 81a is transmitted to the circuit board 60 via a harness 90 (not shown), serving as a set of electrical wires.

As described above, the lens barrel 50a receives the optical block 70a including the relatively small lens 71a and the imaging block 80a including the relatively small CCD 81a. The optical block 70a is arranged in the cylindrical tube 51a. The imaging block 80a is disposed within the truncated ball 52 in which about the half of the cylindrical tube 51a is arranged. The lens barrel 50a including the cylindrical tube 51a and the truncated ball 52 is rotatably held by the mount 40.

More specifically, the support 42 and the retainer 43 are arranged on the base 41 of the mount 40. The support 42 supports the truncated ball 52. The retainer 43 receives the truncated ball 52 to prevent the lens barrel 50a from coming out. In the dome video camera 10a according to the first example, the combination of the support 42, the retainer 43, and the truncated ball 52 is used as an angle adjustment mechanism using a ball joint.

The support 42, constituting the angle adjustment mechanism, includes the movable member 44 that is a closed-end cylinder with a circular hole 44a, which has a diameter smaller than that of the truncated ball 52. The movable member 44 is a die-cast of metal, e.g., aluminum alloy. The rotating shaft 46, arranged in the support 42, supports part of the periphery of the movable member 44 such that the rotating shaft 46 is inserted through the periphery. The set screw 45, arranged in the portion opposed to the rotating shaft 46, supports another part of the periphery of the movable member 44 such that the set screw 45 is screwed through the periphery. Therefore, the truncated ball 52 can be fitted in the hole 44a of the movable member 44. The fitted truncated ball 52 is rotatable in the hole 44a.

The retainer 43 is a die-cast open-end cylinder made of metal, such as aluminum alloy. The retainer 43 has a circular opening 43a having a diameter smaller than that of the truncated ball 52. The retainer 43 is fixed to the support 42 above the movable member 44. Most of the truncated ball 52 is received in the space defined by the retainer 43 and the movable member 44 such that the cylindrical tube 51a and part of the truncated ball 52 are protruded from the opening 43a. Since the truncated ball 52 is larger than the hemisphere of the virtual sphere, the curved surface of the truncated ball 52 adjacent to the cylindrical tube 51a is restrained by the opening 43a, so that the truncated ball 52 is prevented from coming out of the retainer 43.

As described above, the truncated ball 52 is arranged between the opening 43a of the retainer 43 and the hole 44a of the movable member 44 such that the curved surface is fitted to both of the opening and the hole. If a gap is formed between the periphery of the opening 43a (or the hole 44a) and the curved surface of the truncated ball 52 and the friction therebetween is negligible, no restraining force is applied to the rotation of the truncated ball 52. Accordingly, the lens barrel 50a is freely moved in the panning direction and/or the tilting direction to appropriately control the orientation of the lens barrel 50a. Thus, the lens 71a can be determined in a predetermined orientation (direction and angle).

After the orientation of the lens 71a is set, the lens barrel 50a is fixed as shown in FIG. 3. In other words, screwing the set screw 45 causes the movable member 44 to pivot about the rotating shaft 46. Thus, the part, through which the set screw 45 is inserted, of the movable member 44 located apart from the retainer 43 is moved toward the retainer 43, as shown by an arrow in FIG. 3. Consequently, the truncated ball 52 fitted in the hole 44a of the movable member 44 is also moved toward the opening 43a of the retainer 43.

In this instance, the periphery of the hole 44a is in contact with the curved surface of the truncated ball 52 to press the truncated ball 52. Since the direction of movement of the movable member 44 is the same as that of the truncated ball 52 (both of the movable member 44 and the truncated ball 52 are moved in the direction shown by the arrow in FIG. 3), the positional relationship between the movable member 44 and the truncated ball 52 (i.e., the orientation of the lens barrel 50a) is not changed. In other words, since the movable member 44 is not rotated relative to the truncated ball 52, any frictional force allowing the truncated ball 52 to rotate is not generated. The movable member 44 presses the truncated ball 52 in the same direction (shown by the arrow in FIG. 3) as that of the movement of the movable member 44. Accordingly, the truncated ball 52 is moved toward the opening 43a of the retainer 43 while being kept in the same position in the hole 44a of the movable member 44.

When the curved surface of the truncated ball 52 is come into contact with the periphery of the opening 43a, the truncated ball 52 is pressed against the periphery of the opening 43a as shown in FIG. 3, so that the truncated ball 52 is pressed between the retainer 43 and the movable member 44. Thus, the truncated ball 52 is fixed to the movable member 44. Consequently, the lens barrel 50a is fixed in the adjusted panning and tilting directions, thus determining the orientation (direction and angle) of the lens 71a with precision.

As described above, in the dome video camera 10a according to the first example, the direction and angle of the lens barrel 50a (the orientation of the lens 71a) can be easily determined with precision by appropriately rotating the truncated ball 52 and then fixing the rotated ball. After the cover 20 is attached to the casing 30, a desired area can be monitored using images captured by the dome video camera 10a.

The optical block 70a (excluding the lens 71a) is located within the virtual sphere of the truncated ball 52 indicated by the dashed line in FIG. 3. So long as the optical block 70a is arranged within the hollow truncated ball 52, therefore, the lens 71a (or the cylindrical tube 51a) can be increased in size without increasing the radius of the truncated ball 52, i.e., the distance between the center of rotation of the truncated ball 52 and the lens 71a. Advantageously, the amount of light transmitting through the lens 71a can be increased and higher image quality can be obtained.

The reason why the lens 71a is located on the outside of the virtual sphere of the truncated ball 52 is that the spacing between the cover 20 and the lens 71a is reduced to prevent distortion of a captured image. In other words, the cover 20 covers the exterior of the retainer 43 and the truncated ball 52 is received in the interior of the retainer 43. Consequently, a space for arrangement of the retainer 43 is created between the cover 20 and the virtual sphere of the truncated ball 52. Only the lens 71a is close to the cover 20 in order to partially fill the space. To minimize the dome video camera 10a, therefore, most of the optical block 70a excluding the lens 71a is preferably arranged within the virtual sphere of the truncated ball 52.

Second Example

Figure 4:
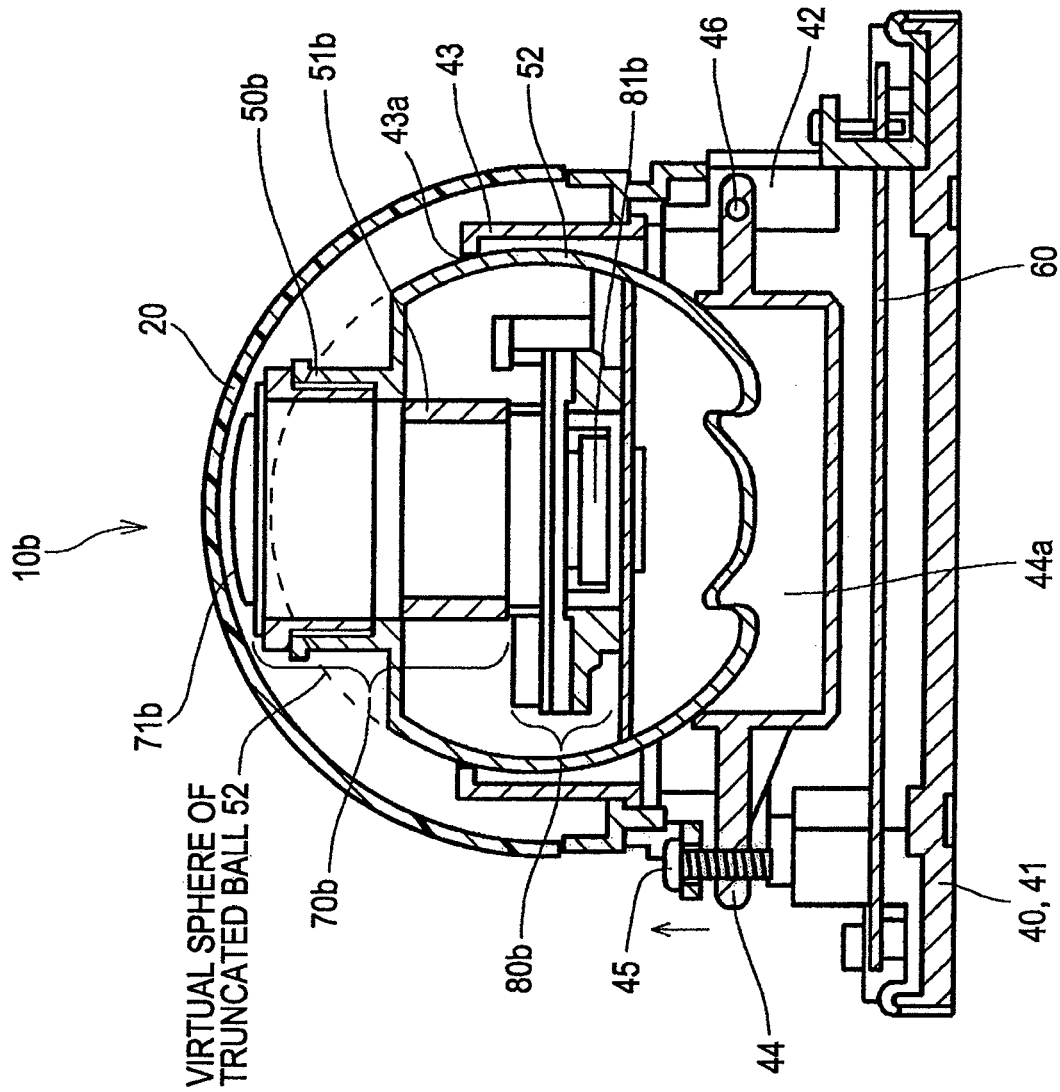
FIG. 4 is a cross-sectional view of a dome video camera according to a second example of the embodiment.

FIG. 4 is a cross-sectional view of a dome video camera 10b according to a second example of the present embodiment.

Referring to FIG. 4, the dome video camera 10b uses a relatively large lens 71b for high image quality, the lens 71b being larger than the lens 71a of the dome video camera 10a (refer to FIG. 3) according to the foregoing first example. The same cover 20 in the dome video camera 10a of the first example can be used in the dome video camera 10b to avoid an increase in the size of the dome video camera 10b.

Since the lens 71b is relatively large, an optical block 70b and a cylindrical tube 51b are also large to fit the lens 71b. About the outer half of the optical block 70b (or the cylindrical tube 51b) in which the lens 71b is arranged is located on the outside of the same rotating truncated ball 52 as that in the dome video camera 10a of the first example in FIG. 3. About the inner half thereof is disposed in the truncated ball 52 that is hollow. The truncated ball 52 is larger than the hemisphere of the virtual sphere indicated by a dashed line in FIG. 4 and is hollow. So long as the optical block 70b (the cylindrical tube 51b) is received in the hollow truncated ball 52, therefore, the optical block 70b (the cylindrical tube 51b) can be larger than the optical block 70a (the cylindrical tube 51a) in the dome video camera 10a according to the first example shown in FIG. 3.

A CCD 81b (corresponding to the imaging device in the present embodiment) is relatively large to match the lens 71b. The whole of an imaging block 80b including the CCD 81b is located within the same truncated ball 52 as that in the dome video camera 10a according to the first example shown in FIG. 3. The imaging block 80b includes the relatively large CCD 81b and a CCD substrate mounted with the CCD 81b. The CCD 81b is disposed on the rear side of the optical block 70b on the optical axis of the lens 71b. Therefore, the whole of the imaging block 80b is located within the hollow truncated ball 52.

As described above, in the dome video camera 10b according to the second example shown in FIG. 4, part (about the inner half) of the optical block 70b and the whole of the imaging block 80b are arranged within the same truncated ball 52 as that in the dome video camera 10a according to the first example shown in FIG. 3 in a manner similar to the dome video camera 10a in which part of the optical block 70a and the imaging block 80a are received in the truncated ball 52. The most part of the optical block 70b excluding the lens 71b is arranged in the virtual sphere, indicated by the dashed line of FIG. 4, obtained by extending the curved surface of the truncated ball 52.

In both of the dome video cameras 10a and 10b according to the first and second examples shown in FIGS. 3 and 4, the most part of each optical block (70a, 70b) excluding the lens (71a, 71b) is disposed within the virtual sphere of the truncated ball 52 with the same size. Therefore, the distance from the center of rotation of the truncated ball 52 to the lens 71a is the same as that to the lens 71b. In other words, the same cover 20 can be used irrespective of the size of the lens 71a or 71b (the size of the optical block 70a or 70b). Advantageously, although the dome video camera 10b includes the large lens 71b for high image quality instead of the small lens 71a, the size of the dome video camera 10b is not increased.

The same truncated ball 52 can be adapted to various optical blocks including different sized lenses, i.e., the optical block 70a including the lens 71a and the optical block 70b including the lens 71b. In the dome video camera 10b according to the second example, therefore, the direction and angle of a lens barrel 50b (or the orientation of the lens 71b) can be easily set with high precision using the same support 42, retainer 43, and truncated ball 52, which constitute the angle adjustment mechanism. After that, the same cover 20 is attached and image capture is performed. Thus, a desired area can be monitored.

Light coming from a subject to be imaged is formed as an image on the imaging surface of the CCD (81a, 81b) through the lens (71a, 71b), the formed image is converted into electrical signals, and the signals are transmitted to the circuit board 60. The signals are transmitted via the harness 90 (not shown), serving as a set of electrical wires. Accordingly, arrangement of the harness 90, which connects to the lens barrel (50a, 50b) rotated in the panning direction and/or the tilting direction by the truncated ball 52 and connects to the circuit board 60 fixed to the mount 40, may be a problem that needs to be addressed.

Figure 5:
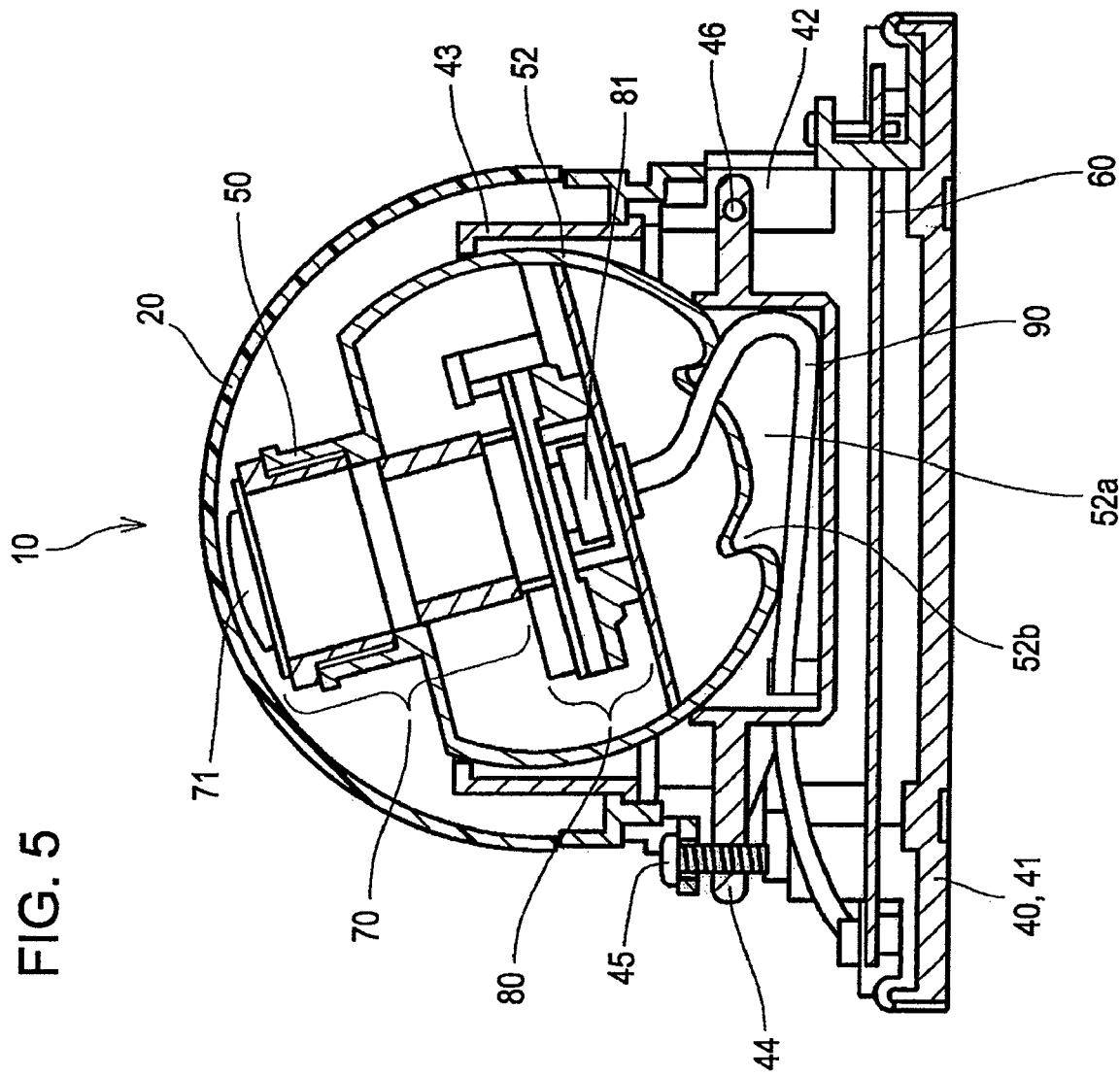
FIG. 5 is a cross-sectional view of the dome video camera according to the embodiment in which the orientation of a lens is determined.

FIG. 5 is a cross-sectional view of the dome video camera 10 according to the present embodiment and shows a state where the orientation (direction and angle) of the lens 71 is determined.

Referring to FIG. 5, the lens barrel 50 is appropriately rotated in the panning direction and/or the tilting direction and the set screw 45 is screwed, so that the truncated ball 52 is pressed and fixed between the retainer 43 and the movable member 44. Consequently, the lens 71 is set so as to have a desired orientation within the cover 20.

Since the optical block 70 and the imaging block 80 are received in the lens barrel 50, both of the optical block 70 and the imaging block 80 are tilted in the same direction as that in which the lens barrel 50 is tilted so long as the lens barrel 50 is tilted relative to the mount 40. Imaging signals output from a CCD 81 are transmitted via the harness 90, serving as a set of electrical wires, to the circuit board 60 fixed to the base 41 of the mount 40. The curved surface of the truncated ball 52 has a hole 52a to permit the lens barrel 50 to tilt (or to allow rotation of the truncated ball 52). The harness 90 is arranged through the hole 52a.

The hole 52a is star-shaped when viewed from the front and has notches 52b. The notches 52b prevent the harness 90 to be caught between the truncated ball 52 and the movable member 44. In other words, the truncated ball 52 is rotatably fitted in the movable member 44. If the truncated ball 52 is largely rotated, any of the notches 52b receives the harness 90, thus preventing a break in the harness 90. It is preferred that the hole 52a be hexagonal and six notches 52b be arranged at the respective vertices. Further, the hole 52a having the notches 52b is preferably defined by a curved line so that the harness 90 is movable along the periphery of the hole 52a.

The harness 90 extending through the hole 52a of the truncated ball 52 is passed through the movable member 44 and is then connected to the circuit board 60. In this instance, the movable member 44 is supported by the support 42 through the set screw 45 and the rotating shaft 46 such that the movable member 44 is arranged away from the circuit board 60. Since the movable member 44 is a closed-end cylinder, the harness 90 extending through the hole 52a is held on the bottom of the movable member 44 as shown in FIG. 5. Accordingly, the harness 90 having a sufficient length in consideration of the range of rotation of the truncated ball 52 is not contact with the electronic components mounted on the circuit board 60.

Figure 6A:
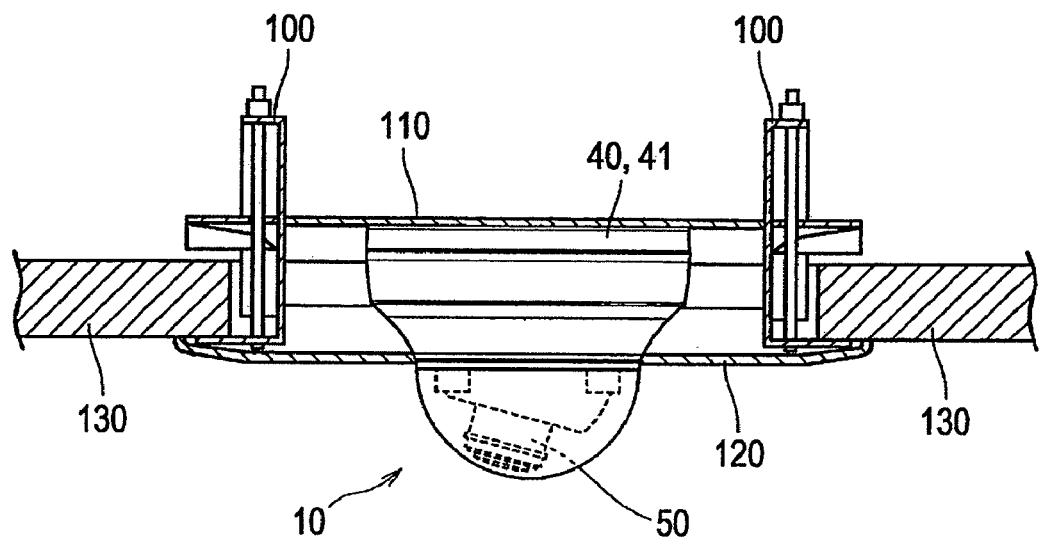
FIG. 6A is a cross-sectional view of the dome video camera according to the embodiment mounted on a ceiling.
Figure 6B:
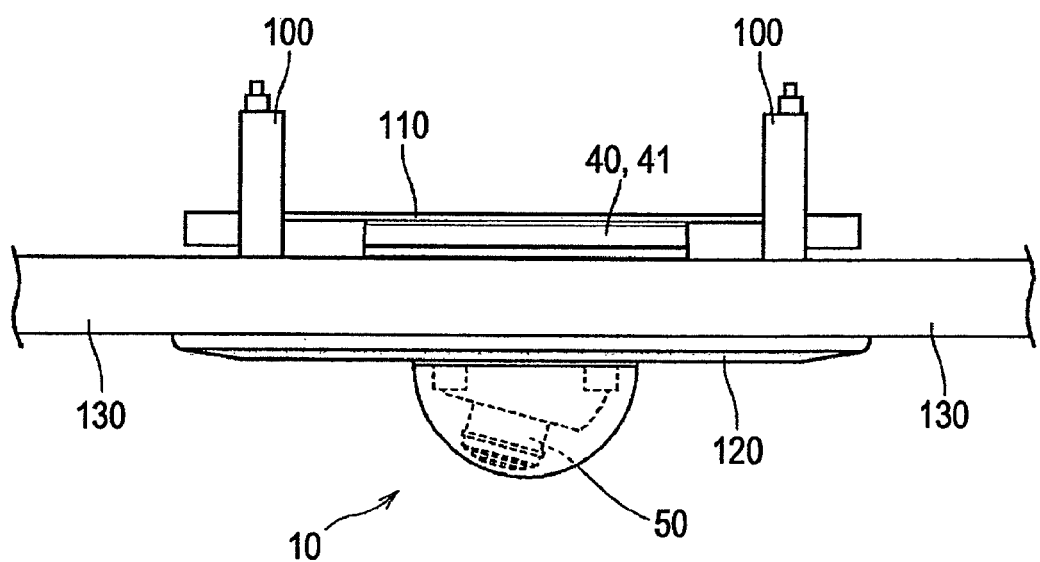
FIG. 6B is a side view of the dome video camera mounted on the ceiling.
Figure 7A:
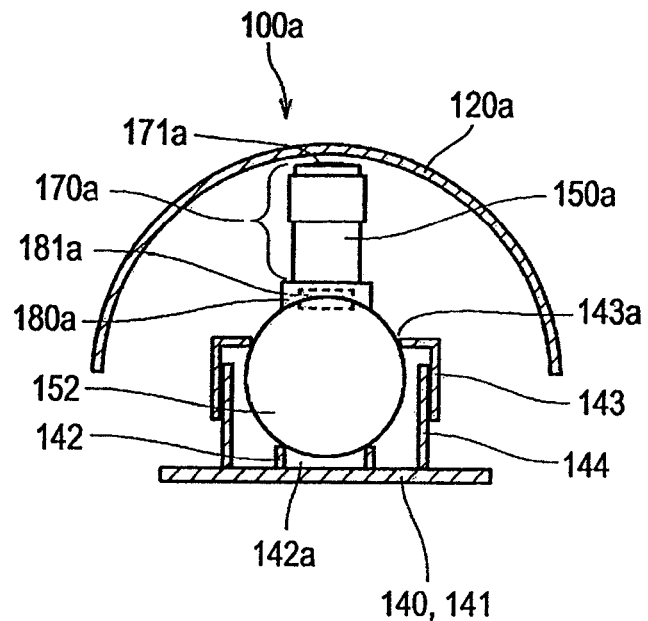
FIG. 7A is a partially sectional view of a related-art dome video camera.
Figure 7B:
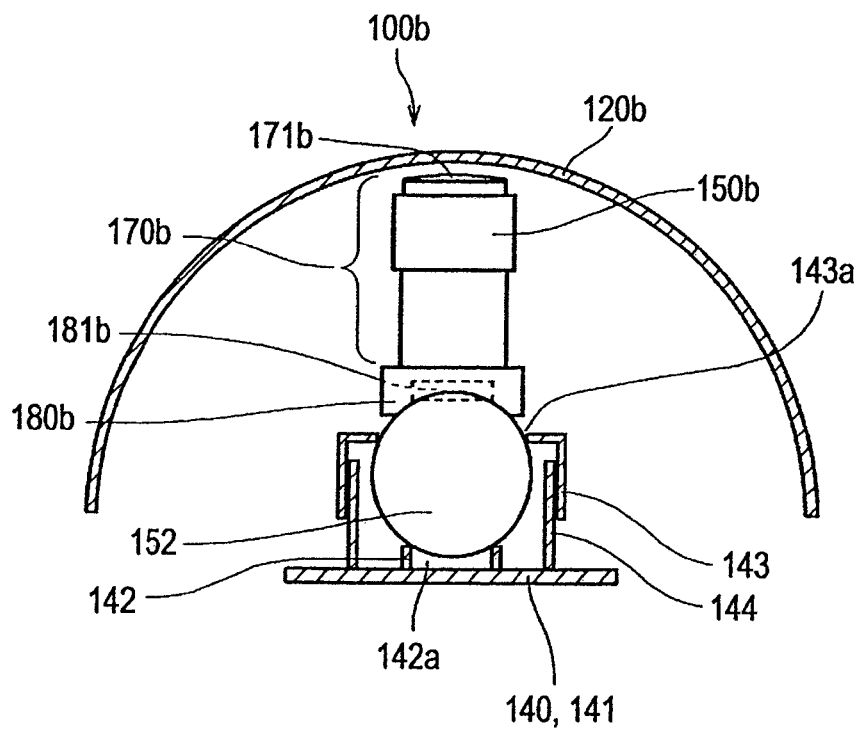
FIG. 7B is a partially sectional view of another related-art dome video camera.

FIG. 6A is a cross-sectional view of the dome video camera 10 according to the present embodiment attached to a ceiling. FIG. 6B is a side view of the dome video camera 10 in this state.

Referring to FIGS. 6A and 6B, the dome video camera 10 is fastened to a ceiling 130 with metal inserts 100. In other words, a bracket 110 is attached to the base 41 of the mount 40 and is then fastened to the ceiling 130 so as to catch a member, serving as the ceiling 130, using the metal inserts 100 arranged in the periphery of the bracket 110. After the angle of the lens barrel 50 is adjusted, a bracket cover 120 is arranged so as to cover the metal inserts 100.

As described above, in the dome video camera 10 according to the present embodiment, the direction and angle of the lens barrel 50 can be easily set with precision to image a desired area. In addition, the use of a lens for high image quality does not cause an increase in the size of the dome video camera 10. Accordingly, the dome video camera 10 is particularly suitable for use as a surveillance camera disposed in a hospital, a hotel, or a department store for purposes of ensuring security and improving serviceability.

While the present invention has been described in its preferred embodiment, it should be understood by those skilled in the art that the present invention is not limited to the embodiment and various modifications, combinations, sub-combinations and alterations may occur depending on design requirements and other factors insofar as they are within the scope of the appended claims or the equivalents thereof.

In the above-described embodiment, the dome surveillance video camera 10 has been described as an example of an imaging apparatus with a rotatable lens barrel. The imaging apparatus to which the present invention is applicable is not limited to this example so long as the imaging apparatus has a rotatable lens barrel. For example, the present invention can be applied to imaging apparatuses, such as a video camera for a conference room, video cameras for various purposes, and imaging apparatuses other than video cameras. In the above-described embodiment, the CCD 81 has been described as an example of the imaging device. The imaging device is not limited to this example. Another imaging device, e.g., a complementary metal oxide semiconductor (CMOS) device may be used.

What is claimed is:

1. An imaging apparatus, comprising:
   an optical block including a lens;
   an imaging block including an imaging device;
   a rotatable truncated ball having a curved surface, the imaging block and a first portion of the optical block being located within a virtual sphere formed by extending the curved surface of the truncated ball, the optical block having a second portion that extends beyond said virtual sphere, the imaging block being rotated when the truncated ball rotates;
   a mount rotatably holding the rotating truncated ball; and
   a substantially stationary dome cover covering the circumferential range of movement of the optical block.

2. The apparatus according to claim 1, wherein
   the mount includes a support and a retainer to hold the truncated ball in order to prevent the truncated ball from coming out, and
   the support includes a set screw, wherein
   when the set screw is rotated in a first direction, the support and the retainer tighten up the truncated ball, and when the set screw is rotated in an opposite direction, the support and the retainer loosen up the truncated ball.

3. The apparatus according to claim 2, wherein
   the support has a circular hole with a diameter smaller than the diameter of the truncated ball and holds the truncated ball such that the truncated ball is fitted in the hole, and
   the retainer has a circular opening with a diameter smaller than the diameter of the truncated ball and holds the truncated ball in the opening such that the ball does not come out of the opening, thereby preventing the lens barrel from coming out.

4. The apparatus according to claim 1, wherein the optical block excluding the lens is located within the virtual sphere, the lens being disposed at least partially in said second portion of said optical block for receiving incident light.

5. The apparatus according to claim 1, wherein the truncated ball is adapted to receive various optical blocks including lenses of different sizes, respectively.

6. The apparatus according to claim 1, wherein the truncated ball is larger than a hemisphere of the virtual sphere.

* * * * *